(No Model.)
J. F. STRAHLE.
SAW SET.
No. 551,061. Patented Dec. 10, 1895.
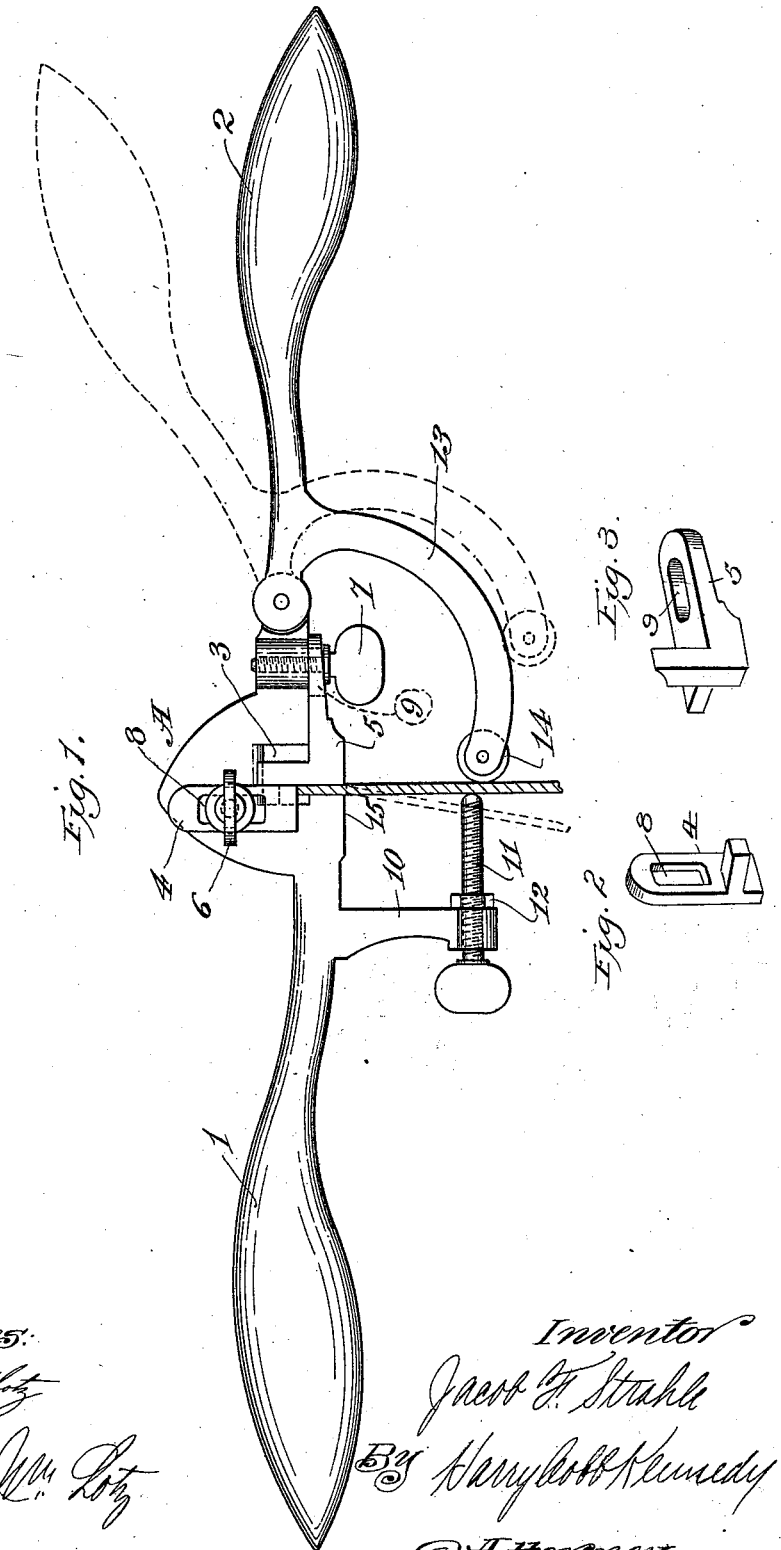

UNITED STATES PATENT OFFICE.

JACOB F. STRAHLE, OF BURR, NEBRASKA.

SAW-SET.

SPECIFICATION forming part of Letters Patent No. 551,061, dated December 10, 1895.

Application filed June 22, 1895. Serial No. 553,766. (No model.)

*To all whom it may concern:*

Be it known that I, JACOB F. STRAHLE, a citizen of the United States, residing at Burr, in the county of Otoe and State of Nebraska, have invented certain new and useful Improvements in Saw-Sets; and I do hereby declare the following to be a full, clear, and exact description of the invention, such as will enable others skilled in the art to which it appertains to make and use the same.

My invention relates to a novel construction in a saw-set, the object being to provide a device of the kind specified of simple and durable construction and efficiency of operation; and it consists in the features of construction and combinations of parts hereinafter fully described and specifically claimed.

In the accompanying drawings, illustrating my invention, Figure 1 is a side elevation of a saw-set constructed in accordance with my invention. Figs. 2 and 3 are detail views, in perspective, of parts of my device.

Referring now to said drawings, A indicates the body of a saw-set constructed in accordance with my invention, which is provided with a handle 1, permanently secured thereto, and a handle 2, pivotally secured thereto. The said body portion A is provided with a recess 3, which receives projections on adjusting-blocks 4 and 5, which are adjustably secured to said body portion by set-screws 6 and 7, respectively, passing through slots 8 and 9 in said adjusting-blocks 4 and 5, respectively. Said handle 1 is provided adjacent said body portion with an arm 10, carrying a set-screw 11, provided with a lock-nut 12 at its end portion. Said handle 2 is provided with a bent arm 13 adjacent its pivot, provided with an antifriction-roller 14 at its end, which is adapted to abut against the end of said set-screw 11.

The operation of my device is as follows: The adjusting-block 4 is set with reference to the length of the saw-tooth so that the end of the tooth will abut against the same when the upper end or base of the tooth is flush with the surface 15. The adjusting-block 5 is then adjusted with reference to the thickness of the saw so that the tooth of same will fit between the end of said block 5 and the opposite face of the recess 3. The saw-tooth is then placed in the recess thus formed until it abuts against the block 4. The roller 14 is then pressed against the saw-blade to press the same against the end of the set-screw 11, which is then set in the position necessary to set the teeth at the proper angle. Every other tooth is then set over to one side of the saw-blade, and after this is accomplished the saw is turned around and the remaining teeth are set to the opposite side. The saw is held in a vise and the saw-set placed upon the teeth, the handle 1 being held in the left hand and the handle 2 in the right hand of the operator. By pressing down upon both handles the tooth is set without changing the position of the saw-blade.

I claim as my invention—

A saw set having a body portion A, a recess 3 in said body portion, adjusting blocks 4 and 5 adjustably secured to said body portion and provided with projections which enter said recess 3, a handle 1 permanently secured to said body portion and provided with an arm 10 carrying a set screw 11 at its end to abut against the saw blade to limit the extent to which the tooth is bent, and a handle 2 pivotally secured to said body portion and provided with a bent arm 13 carrying a roller 14 at its end to abut against the opposite side of the saw blade to hold same firmly against bending, substantially as described.

In testimony whereof I affix my signature in presence of two witnesses.

JACOB F. STRAHLE.

Witnesses:
B. F. GOERKE,
JOHN SINCLAIR.